(12) United States Patent
Mathai et al.

(10) Patent No.: US 8,009,937 B2
(45) Date of Patent: Aug. 30, 2011

(54) CHARGE-BASED MEMORY CELL FOR OPTICAL RESONATOR TUNING

(75) Inventors: Sagi Mathai, Palo Alto, CA (US); Alexandre Bratkovski, Mountain View, CA (US); Duncan Stewart, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 189 days.

(21) Appl. No.: 12/260,006

(22) Filed: Oct. 28, 2008

(65) Prior Publication Data

US 2009/0263076 A1    Oct. 22, 2009

Related U.S. Application Data

(60) Provisional application No. 61/046,322, filed on Apr. 18, 2008.

(51) Int. Cl.
*G02F 1/035* (2006.01)
*H01S 3/08* (2006.01)
*G06E 3/00* (2006.01)
*H01L 29/06* (2006.01)

(52) U.S. Cl. ......... 385/2; 385/1; 385/3; 385/9; 359/107; 359/108; 359/341.1; 257/9; 257/431; 257/432; 372/92; 372/94

(58) Field of Classification Search ............ 372/92, 372/94; 359/107–108, 341.1; 257/9–39, 257/431–432; 385/1–3, 9
See application file for complete search history.

(56) References Cited

U.S. PATENT DOCUMENTS

| | | | | |
|---|---|---|---|---|
| 6,411,752 B1 * | 6/2002 | Little et al. | ...................... | 385/17 |
| 6,651,032 B2 * | 11/2003 | Peterson et al. | .............. | 702/181 |
| 6,665,476 B2 * | 12/2003 | Braun et al. | ..................... | 385/50 |
| 6,909,824 B1 * | 6/2005 | Messica et al. | ................. | 385/30 |
| 6,970,619 B2 * | 11/2005 | Baumann et al. | ................ | 385/25 |
| 7,031,563 B2 * | 4/2006 | Block et al. | ................. | 385/15 |
| 7,310,459 B1 * | 12/2007 | Rahman | ......................... | 385/14 |
| 7,561,759 B2 * | 7/2009 | Gill et al. | .......................... | 385/1 |
| 2006/0215949 A1 | 9/2006 | Lipson et al. | | |

OTHER PUBLICATIONS

Barrios et al., "Silicon Photonic Read Only Memory", Jul. 2006, Journal of Lightwave Technology, vol. 24. No. 7, pp. 2898-2905.*
"Silicon-Based Optical Modulator With Ferroelectric Layer"; NASA Tech Briefs; Referenced in NPO-40935 of NASA Tech Briefs.
"Silicon-Based Optical Modulator With Ferroelectric Layer"; Sep. 1, 2006; NASA's Jet Propulsion Laboratory; Pasadena, CA; http://www.techbriefs.com/content/view/36/34/.

* cited by examiner

*Primary Examiner* — Brian M. Healy
*Assistant Examiner* — Guy Anderson

(57) ABSTRACT

An optical resonator configured to be tuned using a charge-based memory cell includes an optical cavity configured to transmit light and receive injected charge carriers; a charge-based memory cell in proximity to or within the optical cavity, the memory cell containing a number of trapped charges which influence the resonant optical frequency of the optical resonator. A method of tuning an optical resonator includes applying a voltage or current to a charge-based memory cell to generate a non-volatile charge within the memory cell, the nonvolatile charge changing a resonant frequency of the optical resonator.

21 Claims, 7 Drawing Sheets

CHARGE-BASED MEMORY CELL FOR OPTICAL RESONATOR TUNING

CROSS-REFERENCE TO RELATED APPLICATION

The present application claims priority from provisional application Ser. No. 61/046,322, filed Apr. 18, 2008, the contents of which are incorporated herein by reference in their entirety.

BACKGROUND

Light beams or optical signals are frequently used to transmit digital data. For example, optical signals are used in fiber optic systems for long-distance telephony and internet communication. Additionally, optical signals are frequently used to transmit data between electronic components on a single circuit board or between electronic components on adjacent or nearby circuit boards.

Consequently, optical technology plays a significant role in modern telecommunications and data transmission. Examples of optical components used in such systems include optical or light sources such as light emitting diodes and lasers; waveguides; fiber optics; lenses and other optics; photo-detectors and other optical sensors; optically-sensitive semiconductors; optical modulators, and others.

Such systems making use of optical components often rely upon the precise manipulation of optical energy, usually in the form of a light beam, to accomplish a desired task, such as data transmission. This is especially true in systems utilizing light for high-speed, low-energy communication between two nodes.

Often, optical resonators are used to selectively filter, switch, or modulate light beams. Ring resonators are a type of optical resonator. Ring resonators typically have an optical waveguide in a closed loop coupled to a tangential waveguide. When light of the appropriate wavelength is coupled to the loop by the tangential waveguide, the ring resonator can serve as a modulator or detector. The amount of energy coupled into the ring resonator depends on a variety of factors including the characteristic resonant optical frequency of the ring.

In some cases, it can be desirable to tune the resonant optical frequency to set the operating point of an optical resonator, compensate for instabilities within the system, or allow the resonator to act on a different frequency of optical energy within the tangential waveguide.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
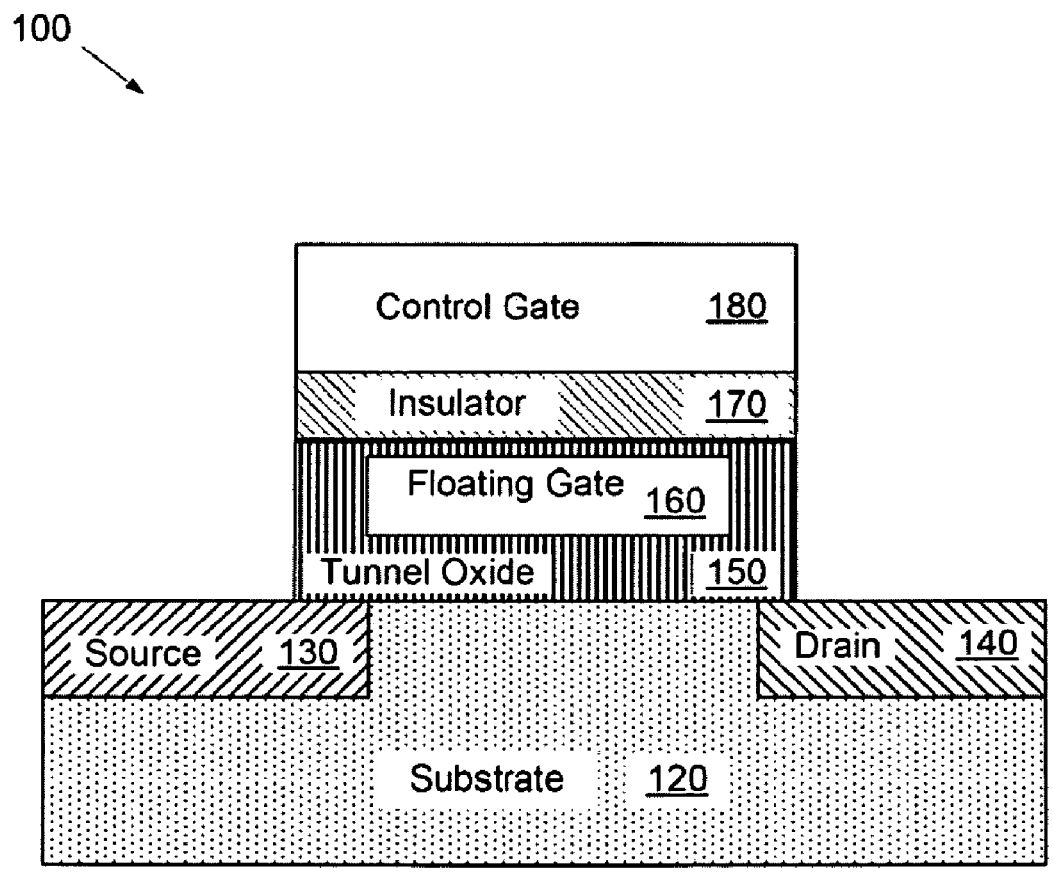
FIG. 1 is a diagram illustrating the components and operating principals of a charge-based memory cell, according to one embodiment of principles described herein.

As described above, optical resonators, such as ring resonators, may be used in many different optical devices. Ring resonators typically comprise an optical waveguide formed in a circular or elliptical annulus. The ring resonator is optically coupled to a tangential waveguide. In some cases, it can be desirable for the optical resonant frequency of the ring resonator to substantially match the optical frequency of a portion of energy passing through the tangential waveguide. For example, in wavelength division multiplexing, the optical energy transmitted through the tangential waveguide can be made up of optical energy divided among a plurality of different wavelength bands or "lines". Each line may be narrow, on the order of 1 MHz to 1 GHz in width. Each different line can serve as a carrier for a separate data signal.

Ring resonators that are optically coupled to the tangential waveguide can be tuned to specific lines for modulation, detection, switching or routing, and de-multiplexing operations. The resonant frequency of a ring resonator is dependant on factors including the material of which it is made, the geometry of the resonator, and its temperature. Manufacturing and material variations can result in ring resonators with resonant frequencies that may not be ideal. Further, changes in the operating environment can cause the resonant frequency of a ring resonator to undesirably shift away from the line frequency at which the ring resonator is intended to resonate. Additionally, it can be desirable to shift the optical resonant frequency of a ring resonator from one line to another. By controlling one or more factors that effect the ring's optical resonant frequency, the ring can be "tuned" to keep its optical frequency aligned with a given line or switch from one line to another.

A variety of techniques have been proposed to tune optical cavities. In one method of tuning an optical resonator, the temperature of the resonator is varied to change the resonant frequency of the ring resonator. This is typically done by including a heating element that is controlled to obtain the desired temperature and therefore the desired resonant frequency of the resonator. The operation of the heating element to stabilize the ring resonator requires the application of a constant DC current or voltage bias. This may consume a significant amount of power. The heat generated must be dissipated and may restrict design options that would otherwise be available. For example, in high density applications, thermal cross talk between ring resonators could be an issue.

An alternative method of tuning an optical cavity includes introducing a bias or offset into the charge injection voltage. This also requires a constant DC current or voltage bias to inject a continuous flow of carriers into the resonator.

Mechanical strain can be used to physically deform the resonator, thereby altering its resonant frequency. However, the mechanical strain may introduce defects into the material being strained. Further, producing mechanical strain typically requires the application of high voltages across an active element to produce the desired strain or displacement.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The current specification describes the use of a charge-based memory cell to tune the optical frequency of a microring or other optical resonator. The charge-based memory is placed in close proximity to the optical waveguide (i.e. on the top side, wrapped around the waveguide, or beneath the waveguide) or incorporated into the optical waveguide. The charges in the memory cell influence the behavior of charge carriers within the core of the resonator, which, in turn, alters the effective index of refraction of the core. Alternatively, the charges in the memory cell may interact with the evanescent optical field outside the core of the waveguide, which also alters the effective index of refraction of the optical waveguide. This change in index of refraction directly correlates to a shift in the resonant optical frequency of the optical resonator. An increase in the charges in the memory cell reduces the index of refraction, while a decrease of charges in the memory cell increases the index of refraction. A variety of nonvolatile memory cells could be used including, but not limited to erasable programmable read-only memory (EPROM), electronically erasable programmable read only memory (EEPROM), flash memory, ferroelectrics, metal capacitor, metal oxide, floating gate, and others.

The key advantages of using a charge-based memory cell to alter the resonant frequency of an optical resonator include: 1) a long timescale before a frequency reset operation is necessary, 2) no power consumption until a frequency set or reset operation is required, and 3) minimum introduction of excess optical loss. Additionally, a charge-based memory cell can be manufactured as an integral part of the ring resonator using conventional lithographic techniques. In most cases, the charge-based memory cell can be implemented without sacrificing the performance of the ring resonator. Those of skill in the art will recognize that the principles disclosed are not limited to ring resonators, but have applicability in tuning the resonant frequency of any optical resonator geometry.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

The principles disclosed herein will now be discussed with respect to illustrative systems and methods.

FIG. 1 is a diagram illustrating the components and operating principals of a charge-based memory cell (100) such as EPROM, EEPROM, or Flash memory cell. A description of the components and operating principles of the illustrative memory cell provides a foundation for understanding the use of a memory cell to optically tune a resonator. It will be appreciated by those of skill in the art that the description below does not limit the principles discussed to the specific geometry or operating principles described, but is merely an illustration of one of many possible embodiments.

The memory cell (100) is comprised of a transistor with a floating gate (160) and a control gate (180) formed on a substrate (120). The floating gate (160) may be made from polysilicon or other suitable conductive material. The floating gate (160) is sandwiched between or surrounded by a tunnel oxide (150) and an insulating layer or layers (170). The source (130) and drain (140) are capacitively coupled to the floating gate (160) through the thin tunnel oxide (150). The floating gate (160) is electrically isolated and serves as a potential well for charge storage. When the floating gate (160) is neutral, the memory cell has a logic value of "1."

To change the logic value to "0" requires forcing electrons into the floating gate (160). Normally, this is achieved by hot electron injection from the channel in the substrate (120) through the tunnel oxide (150). Hot electrons have kinetic energy that exceeds the potential barrier at the substrate (120) tunnel oxide (150) interface. These hot electrons gain their energy from the lateral electric field created by the application of a voltage between the source (130) and drain (140). By simultaneously applying a voltage to the control gate, hot electrons are directed from the substrate (120) into the floating gate (160).

To read the memory cell (100), a voltage is applied to the control gate (180) and the current flowing between the source (130) and drain (140) is measured. When the floating gate is neutral, corresponding to a logic "1," a large current flows. When the floating gate is charged, corresponding to a logic "0," a much smaller current flows.

Higher write voltages and longer write times result in a varying number of charges tunneling into the floating gate (160). By altering the write voltage and write time, the number of trapped charges can be varied. The charges trapped in the floating gate (160) are nonvolatile, meaning that the charges (and thus the data) are not lost when power is removed.

To erase the memory cell, the charges must escape from the floating gate (160) into the substrate. For EPROM memory, electrons gain enough energy to escape by the photoelectric effect (ultraviolet light illumination) so as to surmount the potential barrier at the floating gate (160) tunnel oxide (150) interface. Instead of using ultraviolet light, EEPROM and Flash Memories are erased electrically by applying a voltage to the control gate (180) that causes Fowler-Nordheim tunneling through the tunnel oxide layer (150).

Figure 2:
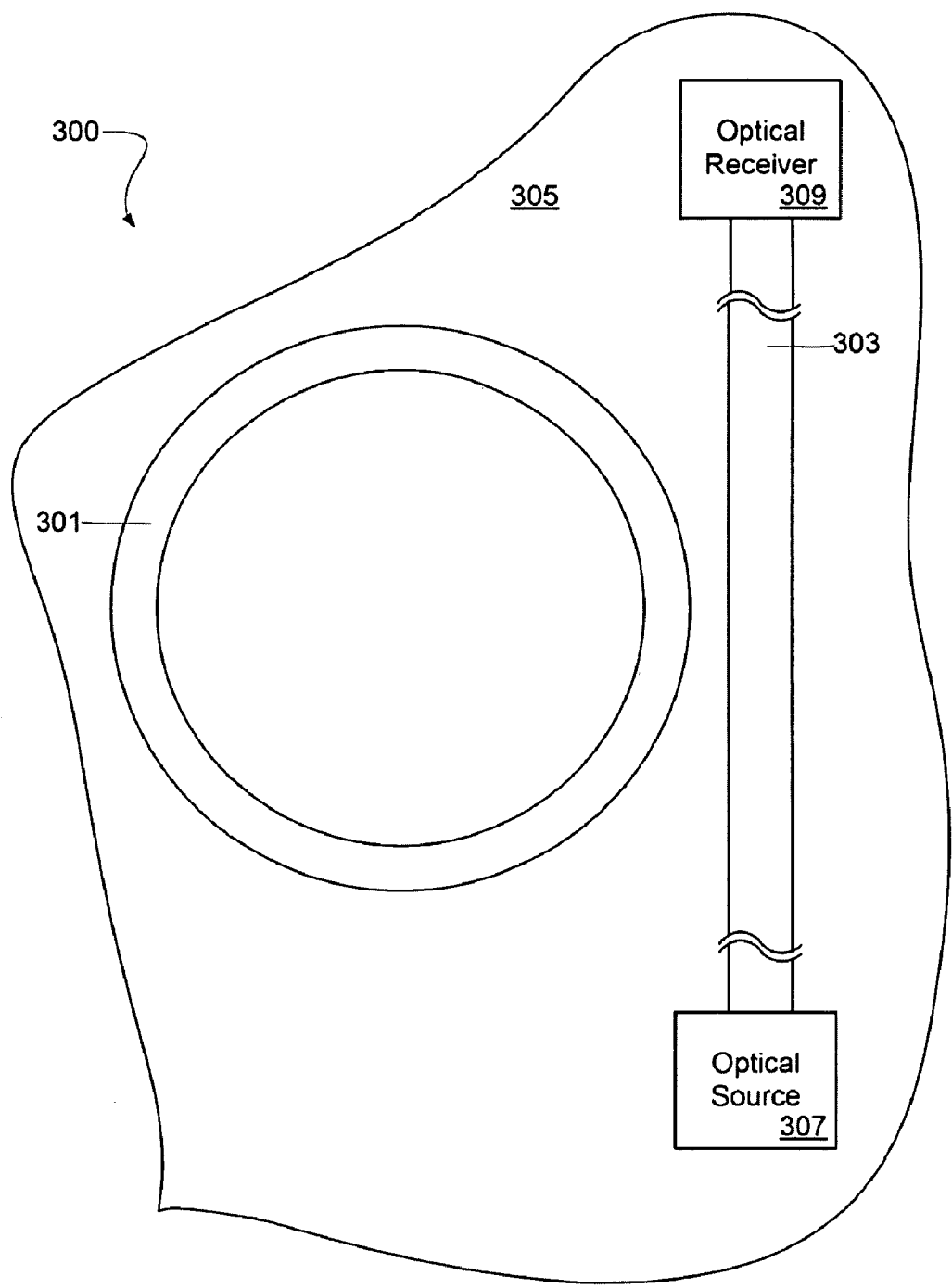
FIG. 2 is a diagram of an illustrative ring resonator and tangential waveguide, according to one embodiment of principles described herein.

Referring now to FIG. 2, a diagram of one embodiment of an optical modulator (300) is shown. The illustrative optical modulator (300) has a first optical-waveguide or "ring resonator" (301) arranged in a loop. A second optical waveguide (303) is tangentially arranged with respect to the ring resonator (301) and is optically coupled to the ring resonator (301). The ring resonator (301) and tangential waveguide (303) are in optical communication with each other near the tangential point on the ring resonator (301).

The optical waveguides (301, 303) may be fabricated out of a variety of materials such as plastics, glasses, and semiconductor materials, such as silicon, gallium arsenide, germanium, or other suitable materials that are at least semitransparent in the desired wavelength region. Other materials, such as metals, may also be included in the optical modulator as electrical conductors or for other uses. The optical waveguides (301, 303) are configured to conduct optical energy and are fabricated on a substrate (305), such as a silicon substrate. In some embodiments, an insulating layer such as silicon dioxide may be deposited on the substrate (305) to encapsulate the optical waveguides (301, 303).

The ring resonator (301) has a resonant frequency which, as mentioned above, is at least partially determined by its cross-sectional dimensions and operating temperature. The ring resonator (301) is configured to sustain optical energy having a wavelength corresponding to the resonant frequency or a range of wavelengths centered on the resonant frequency of the ring resonator (301). Optical energy of non-resonant wavelengths is attenuated or suppressed within the ring resonator (301) by destructive interference.

Optical energy is generated by an optical source (307), such as a laser or a light emitting diode (LED) and enters the modulator (300) through a first end of the tangential waveguide (303). The optical energy is then transmitted into the ring resonator (301) through the optical coupling between the tangential waveguide (303) and the ring resonator (301). As noted above, optical energy having the correct wavelength (i.e. at or near the resonant frequency of the ring resonator) will be sustained by the resonator (301), while optical energy at other wavelengths will be suppressed by destructive interference.

A wavelength that is being used to transmit data between the optical source (307) and the optical receiver (309) may be referred to as the carrier wavelength. The carrier wavelength may or may not correspond to the resonant frequency of the ring (301) depending on how the modulator (300) is configured to perform.

For example, the ring resonator (301) may act as a modulator of the carrier wavelength by selectively varying the amount of coupling between the ring resonator (301) and the tangential waveguide (303) or the amount of absorption of the carrier wavelength within the ring resonator (301) by detuning the resonant frequency of the ring (301) away from the carrier wavelength. The modulated optical energy may then be transmitted through the remainder of the tangential waveguide (303) to the optical receiver (309) disposed at a second end of the tangential waveguide (303). The receiver (309) may be, for example, a photodetector or another waveguide.

Figure 3:
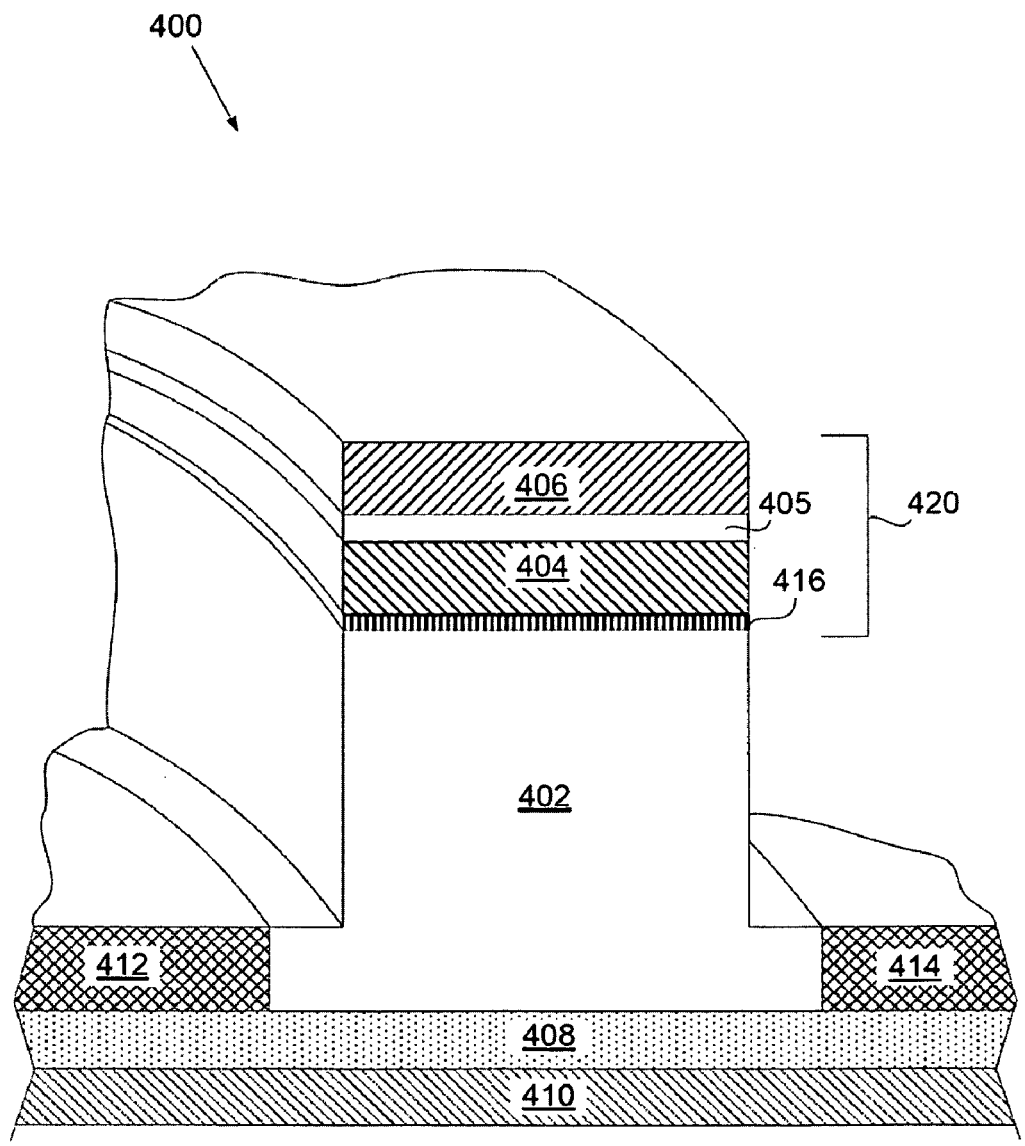
FIG. 3 is a cross-sectional view of an illustrative ring resonator, according to one embodiment of principles described herein.

Referring now to FIG. 3, a cross-sectional perspective view of one illustrative embodiment of a ring resonator (400) is shown. The cross-sectional layers include the core (402) or waveguide of the ring resonator (400), a left electrode (412) and a right electrode (414), a substrate (410), and a dielectric layer (408). A memory cell (420) is deposited on the top of the core (402) and comprises a tunnel oxide (416), floating gate (404), a thick oxide layer (405) and a control gate (406). For illustration purposes, other connections and components of the memory cell (420) are not shown. Those of skill in the art will recognize that the geometry of the memory cell can be reversed. According to one exemplary embodiment, the cross-sectional area and dimensions of the ring resonator (400) will be substantially uniform around the entire annulus, with the possible exception of locations where electrical connections are made between the various components.

The core (402) is the portion of the waveguide in which all or a substantial portion of the optical beam, also referred to as the guided mode, is propagated. According to one exemplary embodiment, the core (402) is made of intrinsic or doped silicon. The left and right electrodes (412, 414) can be made from doped silicon layers or other conductive material. The electrodes (412, 414) inject charge carriers into the core (402). The charge carriers interact with the electrical field corresponding to the guided optical mode propagating through the ring resonator (400). The charge carriers alter the refractive index of the silicon core (402), resulting in a change in the effective index of refraction of the ring resonator (400). The density of charge carriers can be rapidly altered by varying the voltage and current between the two electrodes (412, 414). By altering the effective index of refraction within the ring resonator, the ring resonator (400) can be used to modulate light in the tangential waveguide (303, FIG. 2).

Figure 4:
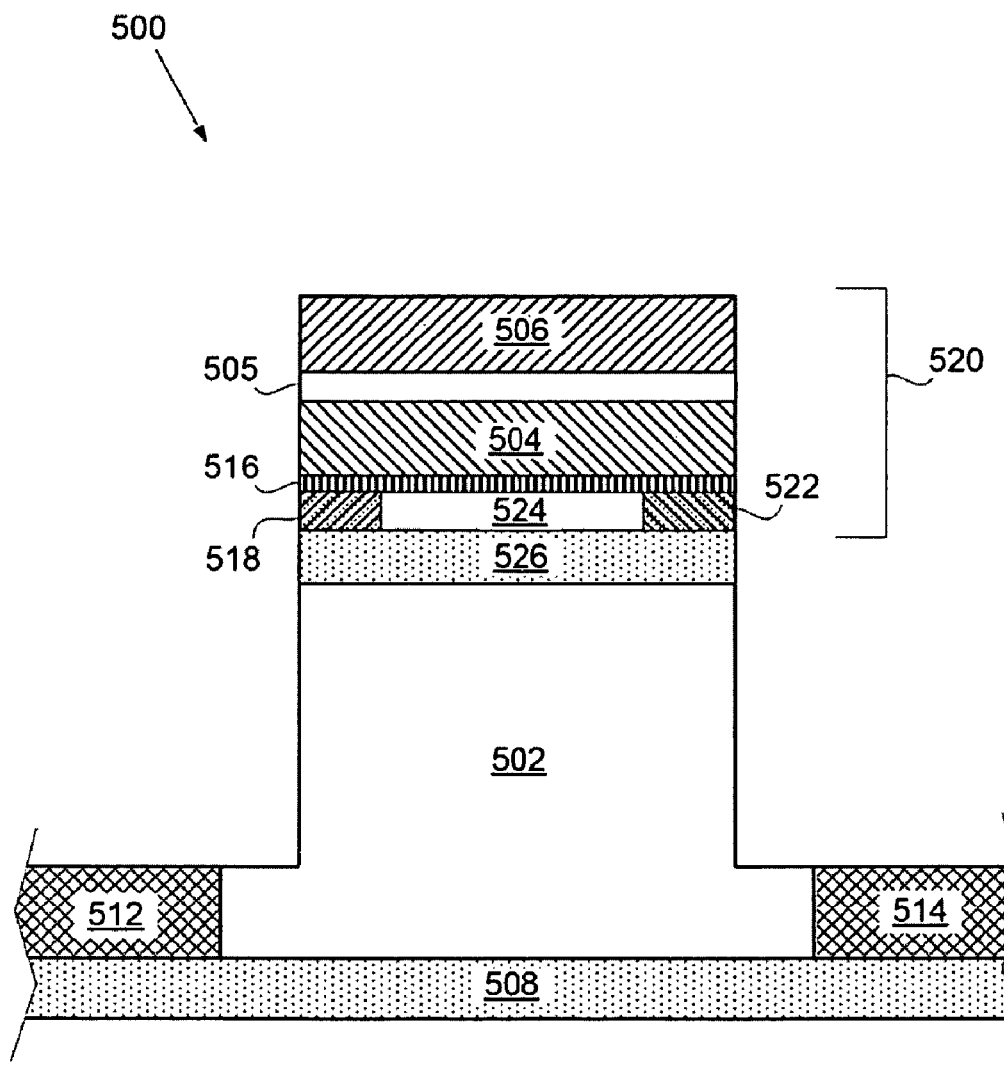
FIG. 4 is a cross-sectional view of an illustrative optical resonator, according to one embodiment of principles described herein.

As shown in FIG. 4, the lower dielectric layer (408) is disposed below the conductive electrodes (412, 414) and the core (402). This dielectric layer (408) functions to both insulate the electrodes (412, 414) from the underlying layers and to space the core (402) away from absorptive or high refractive index materials so as to preserve the optical field passing through the ring resonator (400). According to one exemplary embodiment, the lower dielectric layer (408) is made of an electrically insulating material with an index of refraction less than that of intrinsic silicon to help confine the guided light to the core (402). An example of material that may be used to meet these specifications is silicon dioxide ($SiO_2$).

As mentioned above, the natural resonant frequency of the ring resonator (400) can deviate from a target frequency due to a number of factors. These factors include manufacturing variations, thermal heating, mechanical stress, and other factors. To tune the ring resonator (400) to the desired resonant frequency, varying numbers of electrons can be introduced into the floating gate (404). These electrons remain trapped in the floating gate (404) until an erase process is initiated. The charged floating gate (404) influences the behavior of the charge carriers in the core (402), thereby altering the interaction between the charge carriers and the optical energy passing through the ring resonator (400). This changes the effective index of refraction and tunes the ring resonator (400) to the desired optical frequency.

FIG. 4 is a cross-sectional view of an illustrative ring resonator (500). This embodiment is similar to that shown in FIG. 3 in that it includes a core layer (502), left and right electrodes (512, 514), a lower dielectric layer (508), and a memory cell (520) above the core (502). As previously described, the memory cell (520) may consist of a source (518), a drain (522), a substrate channel (524), a tunnel oxide layer (516), a floating gate (504), a thick oxide layer (505) and a control gate (506).

In some circumstances, directly integrating a memory cell on the top of an optical resonator can undesirably alter the shape of the guided mode and/or introduce undesirable optical losses due to absorption and scattering. An upper dielectric layer (526), for example, an oxide layer, can be interposed to provide greater optical isolation between the core (502) and the memory cell (520). As mentioned above, the lower oxide layer (508) and/or upper dielectric layer (526) may have an index of refraction less than that of intrinsic silicon to help confine the guided light to the core (502). The imposition of the upper dielectric layer (526) between the memory cell (520) and the core (502) increases the distance between the charged floating gate (504) and the charge carriers in the core (502), thereby decreasing the effect of the charges in the floating gate (504) on the charge carriers in the core (502). The thickness of the upper dielectric layer (526) can be chosen to balance the desired amount of optical isolation against decreased electromagnetic influence of the more distant floating gate (504).

Figure 5:
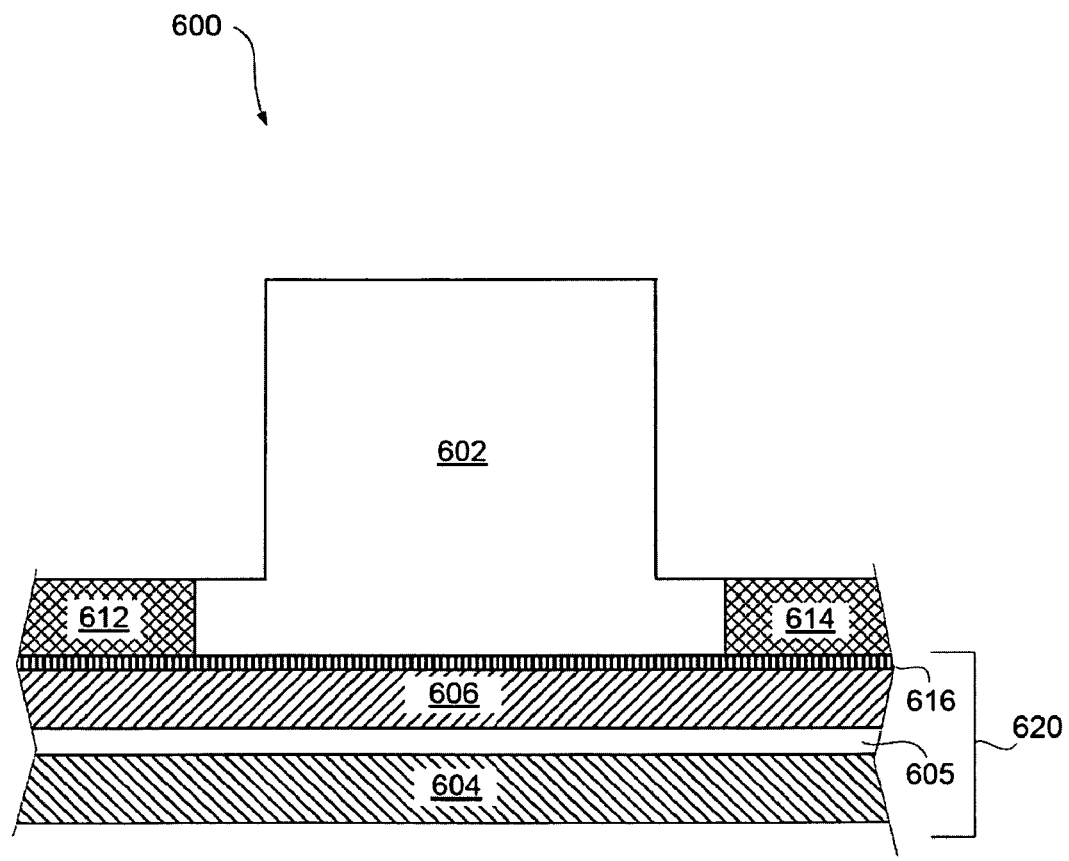
FIG. 5 is a cross-sectional view of an illustrative optical resonator, according to one embodiment of principles described herein.

In alternative embodiments, the memory cell (520) may be replaced with an electrically isolated conductor, such as a capacitor plate. By way of example and not limitation, ferroelectric materials such as lead zirconate titanate or lithium based compounds, metals, and metal oxides could be used to create an electrically isolated capacitor plate. This material, for example, ferroelectric or oxide material, can also be used as a filler material between capacitor plates to increase the amount of stored charge FIG. 5 is a cross-sectional view of an illustrative ring resonator (600). This embodiment is similar those shown in FIG. 3 and FIG. 4. The core (602) and electrodes (612, 614) are in similar configuration. However, the memory cell (620) is now formed under the ring resonator (600). Those of skill in the art will recognize that the geometry of the memory cell can be reversed. As in other figures, the memory cell (620) is illustrated as having a control gate (604) and a floating gate (606) with a thick oxide layer (605) sandwiched in between the two gates (604, 606), and a thin oxide or tunneling layer (616) between the floating gate (606) and the core (602). In this configuration, the distance is minimized between the thin oxide layer (605) and area where the charge carriers are injected into the core (602). This may allow for a greater interaction between the charges on the floating gate (606) and the carrier charges in the core (602). In some circumstances, this may increase the range over which the memory cell (620) is capable of tuning the ring resonator (600). Additionally, this configuration could lower write voltages and/or shorten write times.

Figure 6:
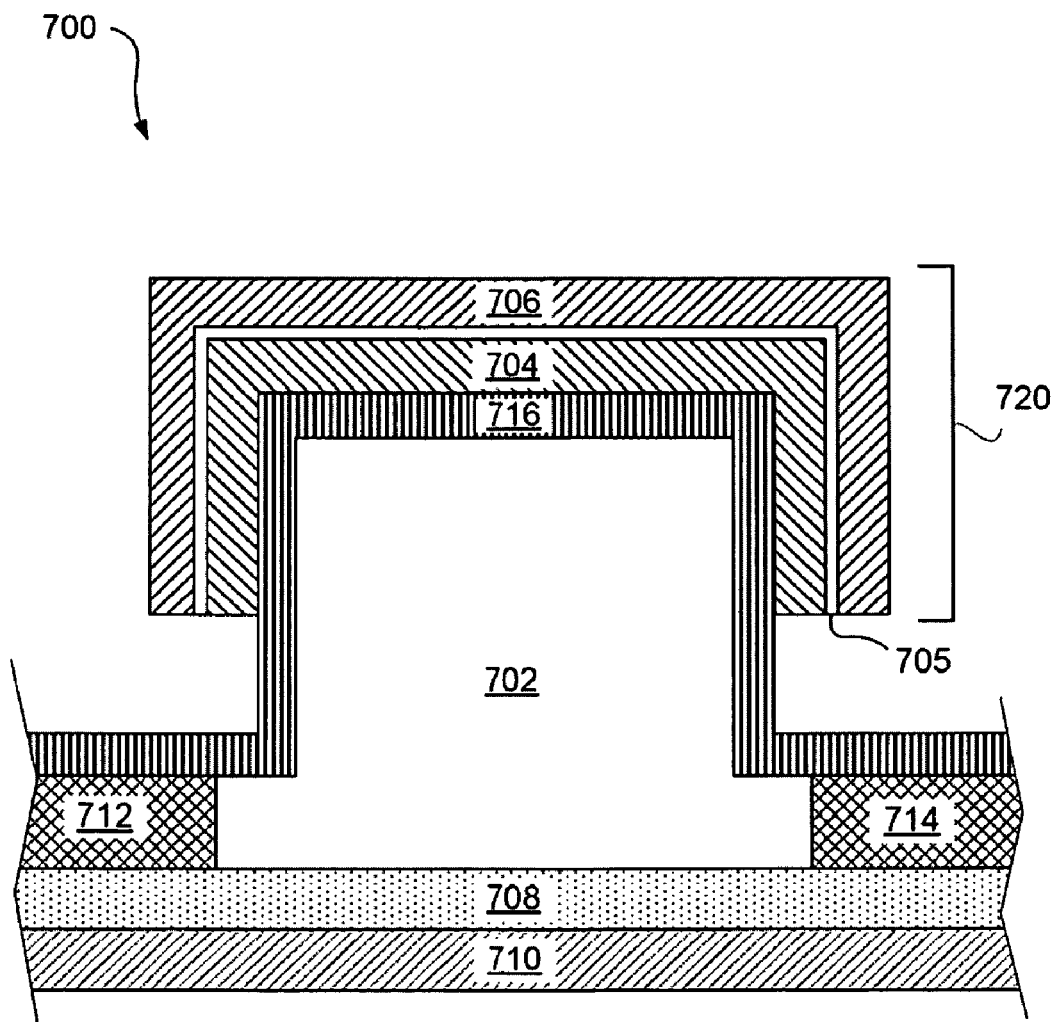
FIG. 6 is a cross-sectional view of an illustrative optical resonator, according to one embodiment of principles described herein.

FIG. 6 is a cross-sectional view of an illustrative ring resonator (700) that is configured to be tuned using a charge-based memory cell (720). As previously discussed, the ring resonator (700) can be formed over a substrate (710) and an insulating oxide layer (708). The ring resonator comprises a core (702), a left electrode (712) and a right electrode (714). The upper surface of the core (702) is covered by a thin oxide or tunneling layer (716). As mentioned above, the dielectric layers (708, 716) electrically insulate the core (702) and help shape the evanescent optical mode.

The memory cell (720) comprises the tunneling layer (716), the floating gate (704), the insulating layer (704) and the control gate (706). Although this embodiment contains similar layers to those discussed in relation to other embodiments, the geometry of the layers above the core (702) are significantly different. In this cross-section, the memory cell (720) extends much wider than, and approximately follows the outline of, the core (702). Because of this change in geometry, it will be possible for the charges trapped within the floating gate (704) to exert a greater influence over the charge carriers within core (702), and therefore create a greater change in the resonant frequency.

In this embodiment, special consideration is given to the tangential gap through which optical energy is coupled into the ring (700) from a second waveguide (e.g., 303, FIG. 2). The improper imposition of materials into the tangential gap can prevent optimal optical coupling between the ring resonator (700) and a second waveguide (e.g., 303, FIG. 2).

Figure 7:
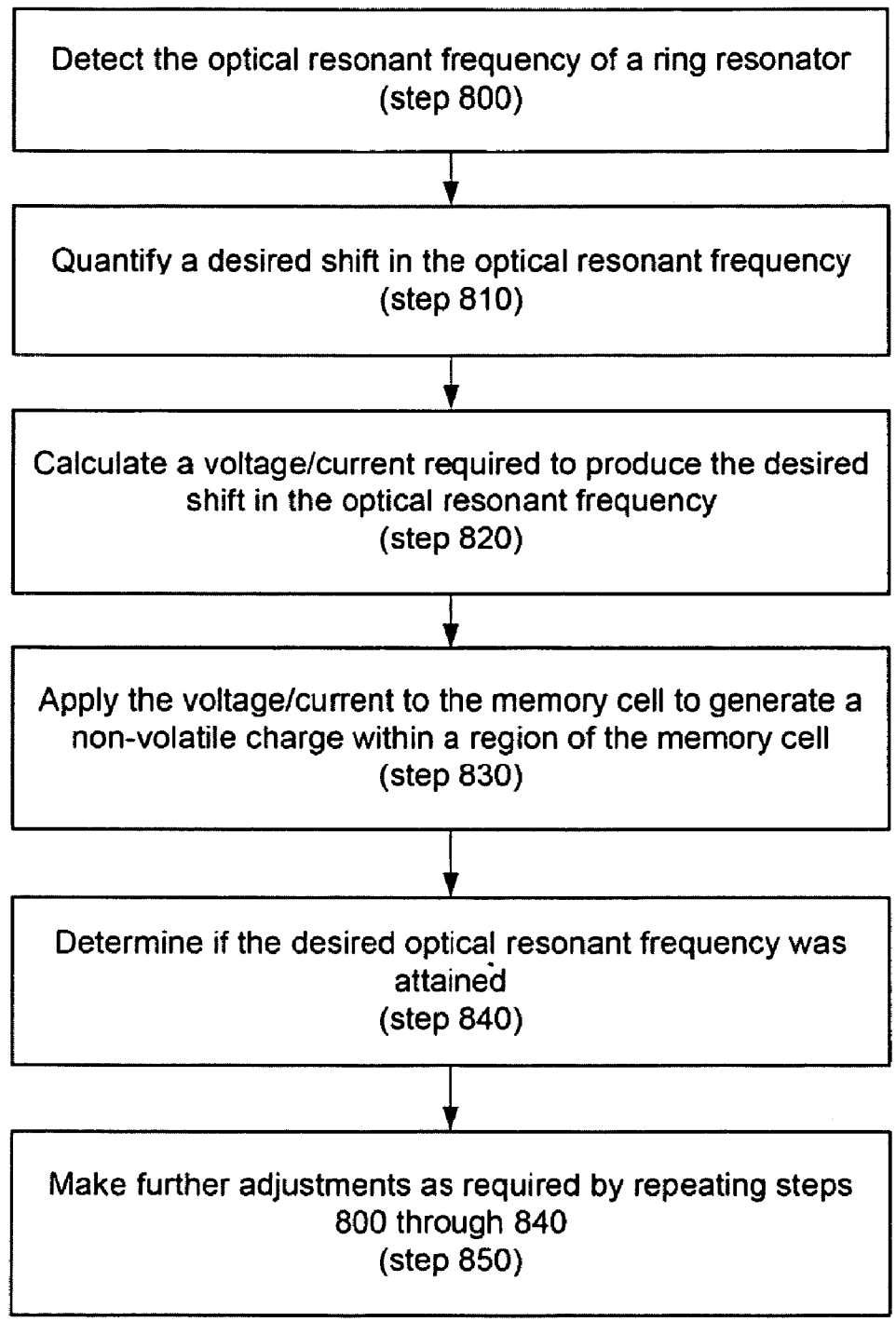
FIG. 7 is a flowchart showing one illustrative method of a tuning an optical resonator using a charge based memory cell, according to one embodiment of principles described herein.

FIG. 7 is a flowchart showing one illustrative method of utilizing a memory cell or capacitive plate to tune a ring resonator or other optical cavity. In a first step, the current optical resonant frequency of the ring resonator is determined (step 800). This determination may be made in a variety of ways including comparing the magnitude of the signal contained within the optical resonator to the available magnitude of a given frequency within the tangential waveguide.

Next, the desired shift in the optical resonant frequency of the ring resonator is determined (step 810). The change in the optical resonant frequency may be comparatively large in some circumstances. For example, changing a ring resonator frequency from one carrier band to another may be a comparatively large change in the resonant frequency. Conversely, when the ring resonator frequency drifts away from the centerline frequency of a given carrier band, the desired shift may be relatively small.

The voltage or current which is to be applied to the memory cell is then calculated to produce the desired shift in the resonant frequency of the resonator (step 820). This calculation may involve accounting for individual differences between ring resonators including calibration constants. The applied voltage may vary depending on the desired shift in the optical resonant frequency, the geometry of the memory cell, and the electromagnetic influence of the charged layer on the carrier charges, and other factors. The step of calculating may be a complex calculation or a simple application of a value. By way of example and not limitation, the step of calculating may comprise: retrieving a calibration value from a look up table; a result of a control loop; altering a parameter in set increments; or applying a proportionality constant to a measured value.

The calculated voltage/current is then applied to the memory cell to generate non-volatile charges within a region of the memory cell (step 830). According one exemplary embodiment, a capacitive plate or layer may be directly charged by the applied voltage. In another embodiment, a current or voltage may induce charges on a floating gate.

Following the application of the calculated voltage or current, the optical resonant frequency of the ring resonator is again measured to see if the desired resonant frequency was attained by the application of the voltage or current (step 840). Further adjustments can be made as needed by repeating steps 800 through 840 (step 850).

In sum, a charge-based memory cell. placed in proximity to or within an optical cavity, can tune the resonant frequency of the optical cavity by influencing the behavior of the charge carriers within the optical cavity. The use of a charge-based memory cell to tune the resonant frequency of an optical cavity has several advantages over other solutions. In some embodiments, the charge-based memory cell can hold charges in a floating gate over a long time scale, thereby maintaining the desired resonant frequency of the optical cavity. The memory cell maintains the desired resonant frequency without a requirement for the application of a constant voltage or current bias. Further, a charge-based memory cell has no power consumption or heat dissipation until a tuning operation is required. The memory cell can be constructed using standard lithographic processes and integrated directly into the optical cavity itself. The memory cell can be constructed so that losses within the optical cavity are not substantially increased and other performance parameters are not sacrificed.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical resonator configured to be tuned using a charge-based memory cell, comprising:
    an optical cavity, said optical cavity being configured to transmit light and receive injected charge carriers, in which said optical cavity has a resonant frequency which differs from a target frequency due to at least one of: geometric manufacturing variation, material variation, thermal heating, and mechanical stress; and
    a charge-based memory cell in proximity to said optical cavity, said charge-based memory cell comprising trapped charges to alter said resonant frequency of said optical cavity to substantially match said target frequency, in which said charged based memory cell surrounds said optical cavity on at least two adjoining sides.

2. The resonator of claim 1, further comprising a first electrode and a second electrode, wherein creating a voltage difference across said first electrode and said second electrode injects charge carriers into said optical cavity.

3. The resonator of claim 1, wherein said charge-based memory cell is separated from said optical cavity by interposing a insulating layer between said charge-based memory cell and said optical cavity.

4. The resonator of claim 3, wherein said insulating layer is comprised of a dielectric material.

5. The resonator of claim 4, wherein said insulating layer is comprised of silicon dioxide.

6. The resonator of claim 1, wherein said charge-based memory cell is a metal oxide semiconductor capacitor.

7. The resonator of claim 1, wherein said charge-based memory cell is comprised of a ferroelectric material.

8. The resonator of claim 1, wherein said charge-based memory cell is an EPROM, EEPROM, or a Flash memory cell.

9. The resonator of claim 1, wherein said charge-based memory cell is charged by hot electron injection.

10. The resonator of claim 1, wherein said optical resonator is a ring resonator.

11. The resonator of claim 1, wherein said optical resonator is a ridge waveguide.

12. The resonator of claim 1, wherein said charge-based memory cell formed on an upper surface of said optical cavity.

13. The resonator of claim 1, wherein said optical cavity is formed above said charge-based memory cell.

14. A ring resonator configured to be tuned using a charge-based memory cell, comprising:
    an optical cavity, said optical cavity comprising an annular ridge waveguide, said annular ridge waveguide being configured to transmit light and receive injected charge carriers, said optical cavity being optically coupled to a second waveguide;
    a first electrode and a second electrode, wherein placing a voltage across said first electrode and said second electrode injects charge carriers into said annular ridge waveguide;
    a charge-based memory cell in proximity to one or more surfaces of said annular ridge waveguide, wherein a tunnel oxide layer in said charge-based memory cell is separated from said annular ridge waveguide by interposing a silicon dioxide dielectric layer between said memory cell and said annular ridge waveguide, wherein said charge-based memory cell contains a number of trapped charges, said trapped charges influencing said charge carriers within said annular ridge waveguide such that the optical frequency of said optical cavity is tuned from a first resonant frequency to a second resonant frequency; said second resonant frequency substantially matching a frequency of optical energy passing through said second waveguide.

15. A method of utilizing a charge-based memory cell to tune an optical resonator comprising: applying a voltage or current to said charge-based memory cell in proximity to said optical resonator to generate a non-volatile charge within a region of the charge-based memory cell, said non-volatile charge changing a resonant frequency of said optical resonator an optical cavity to substantially match a target frequency, said optical cavity being configured to transmit light and receive injected charge carriers, in which said resonant frequency which differs from said target frequency due to at least one of: geometric manufacturing variation, material variation, thermal heating, and mechanical stress, in which said charged based memory cell surrounds said optical resonator on at least two adjoining sides.

16. The method of claim 15, further comprising:
    detecting said resonant frequency of said optical cavity;
    quantifying a desired shift in said resonant frequency;
    calculating a magnitude and duration of voltage pulse to be applied to said charge-based memory cell; and
    applying said voltage pulse to said charge-based memory cell such that said non-volatile charge is altered such that said resonant frequency of said optical cavity is changed.

17. The method of claim 16, further comprising selectively tuning said optical cavity to specific light frequencies within an optical signal.

18. The method of claim 16, further comprising selectively tuning said optical cavity to compensate for a drift in said resonant frequency of said cavity.

19. The resonator of claim 14, in which said charge-based memory cell further comprises a source electrode and drain electrode, said source electrode and said drain electrode being distinct from said first electrode and said second electrode.

20. The resonator of claim 19, in which said source electrode and said drain electrode are electrically separated from said annular ridge waveguide by said silicon dioxide dielectric layer.

21. An optical resonator comprising:
    an optical cavity with a resonant frequency which differs from a predetermined frequency due to at least one of: geometric manufacturing variation, material variation, thermal heating, and mechanical stress; and
    a charge-based memory cell adjacent to the optical cavity, the charge-based memory cell comprising trapped charges to alter the resonant frequency of the optical cavity to substantially match the predetermined frequency; and
    a first electrode and a second electrode, in which said first electrode and said second electrode are each in direct contact with both a tunnel oxide layer in the charge-based memory cell and said optical cavity.

* * * * *